(12) United States Patent
Basque

(10) Patent No.: US 7,076,935 B2
(45) Date of Patent: Jul. 18, 2006

(54) CONVERTIBLE COMPUTER CONTROLLED FFS BAGGING MACHINE

(75) Inventor: Roland Basque, Brossard (CA)

(73) Assignee: Glopak Inc., Montreal (CA)

( * ) Notice: Subject to any disclaimer, the term of this patent is extended or adjusted under 35 U.S.C. 154(b) by 0 days.

(21) Appl. No.: 10/794,522

(22) Filed: Mar. 5, 2004

(65) Prior Publication Data

US 2005/0193689 A1    Sep. 8, 2005

(51) Int. Cl.
*B65B 9/06* (2006.01)

(52) U.S. Cl. .................. 53/551; 53/55; 53/545

(58) Field of Classification Search .............. 53/545, 53/548, 550, 551, 552, 553, 554, 52, 55, 53/501, 502

See application file for complete search history.

(56) References Cited

U.S. PATENT DOCUMENTS

| | | | | |
|---|---|---|---|---|
| 3,916,598 A | * | 11/1975 | Adams et al. .................. 53/55 |
| 4,537,016 A | * | 8/1985 | Shanklin et al. ............... 53/550 |
| 4,757,668 A | * | 7/1988 | Klinkel et al. ................. 53/551 |
| 5,485,712 A | * | 1/1996 | Cherney et al. ............... 53/552 |
| 5,533,322 A | * | 7/1996 | Bacon et al. .................. 53/551 |
| 5,537,798 A | * | 7/1996 | Fukuda et al. ................. 53/55 |
| 5,826,403 A | | 10/1998 | Haley |
| 6,079,188 A | * | 6/2000 | Katayama et al. ............. 53/551 |
| 6,200,249 B1 | * | 3/2001 | Fukuda ......................... 53/551 |
| 6,357,210 B1 | * | 3/2002 | Wetter ......................... 53/537 |
| 6,598,367 B1 | * | 7/2003 | Nakagawa et al. ............ 53/551 |
| 6,834,480 B1 | * | 12/2004 | Ishino et al. .................. 53/551 |

FOREIGN PATENT DOCUMENTS

GB    2311759        10/1997
GB    2390075 A     12/2003

* cited by examiner

*Primary Examiner*—Louis Huynh
(74) *Attorney, Agent, or Firm*—Carter, Schnedler & Monteith

(57) ABSTRACT

A convertible computer controlled form, fill and seal bagging machine comprising a film drive drawing a film sheet about a pouch former with the film sheet being folded and overlapped along longitudinal edge portions; a first sealer heat fusing the overlapped edge portions together to form a hollow film tube; a temperature and a pressure controller controlling the temperature and pressure of the first sealer; a transverse sealer forming a transverse seal across the hollow film tube; a feeder supplying a predetermined content in the hollow tube at a pouch forming station; a computer controller controlling the temperature and pressure of the first sealer to progressively form a seal along the longitudinal edge portions based on a selected predetermined programmed pouch size and the length of the seal bar of the first sealer.

13 Claims, 4 Drawing Sheets

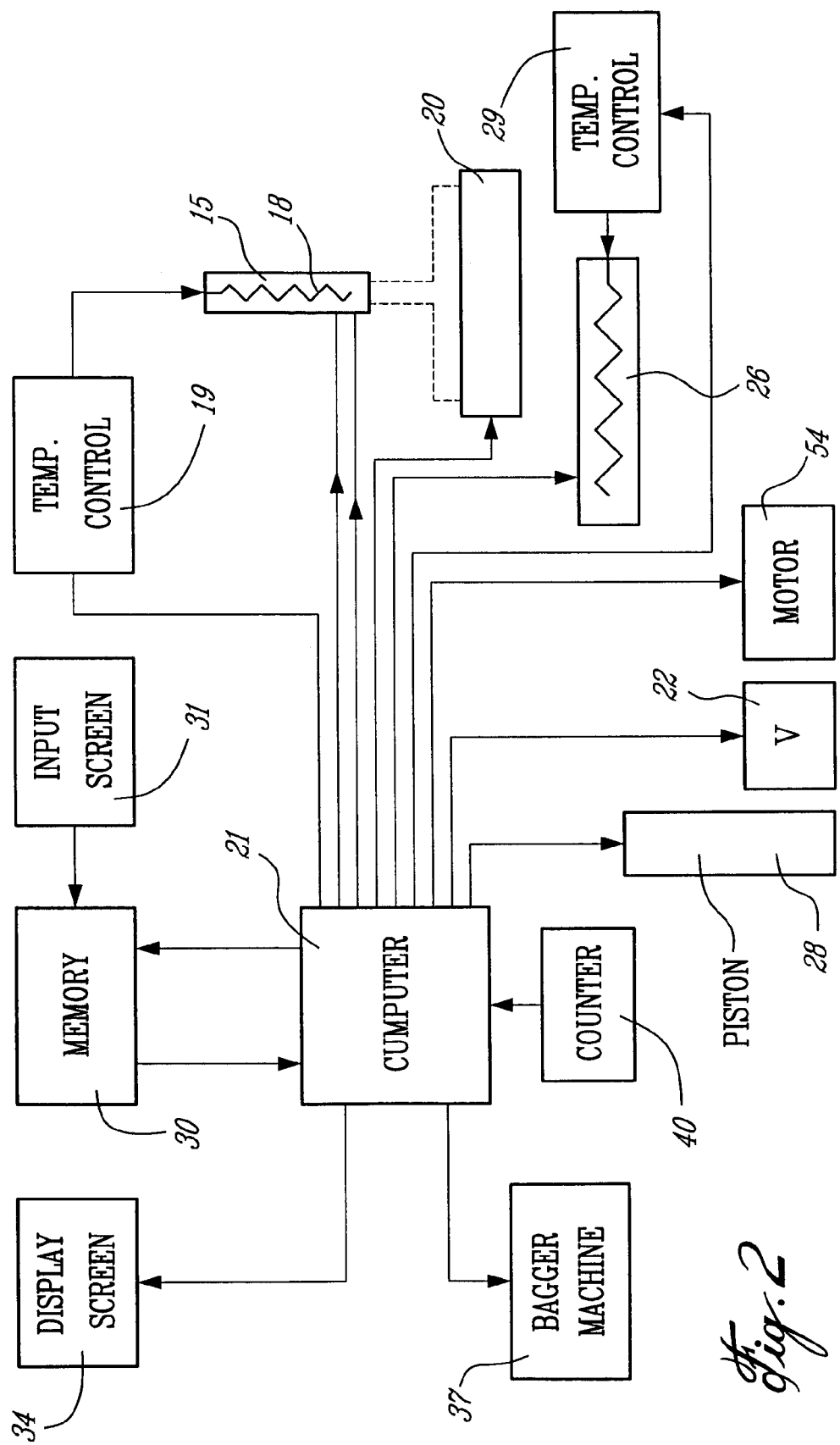

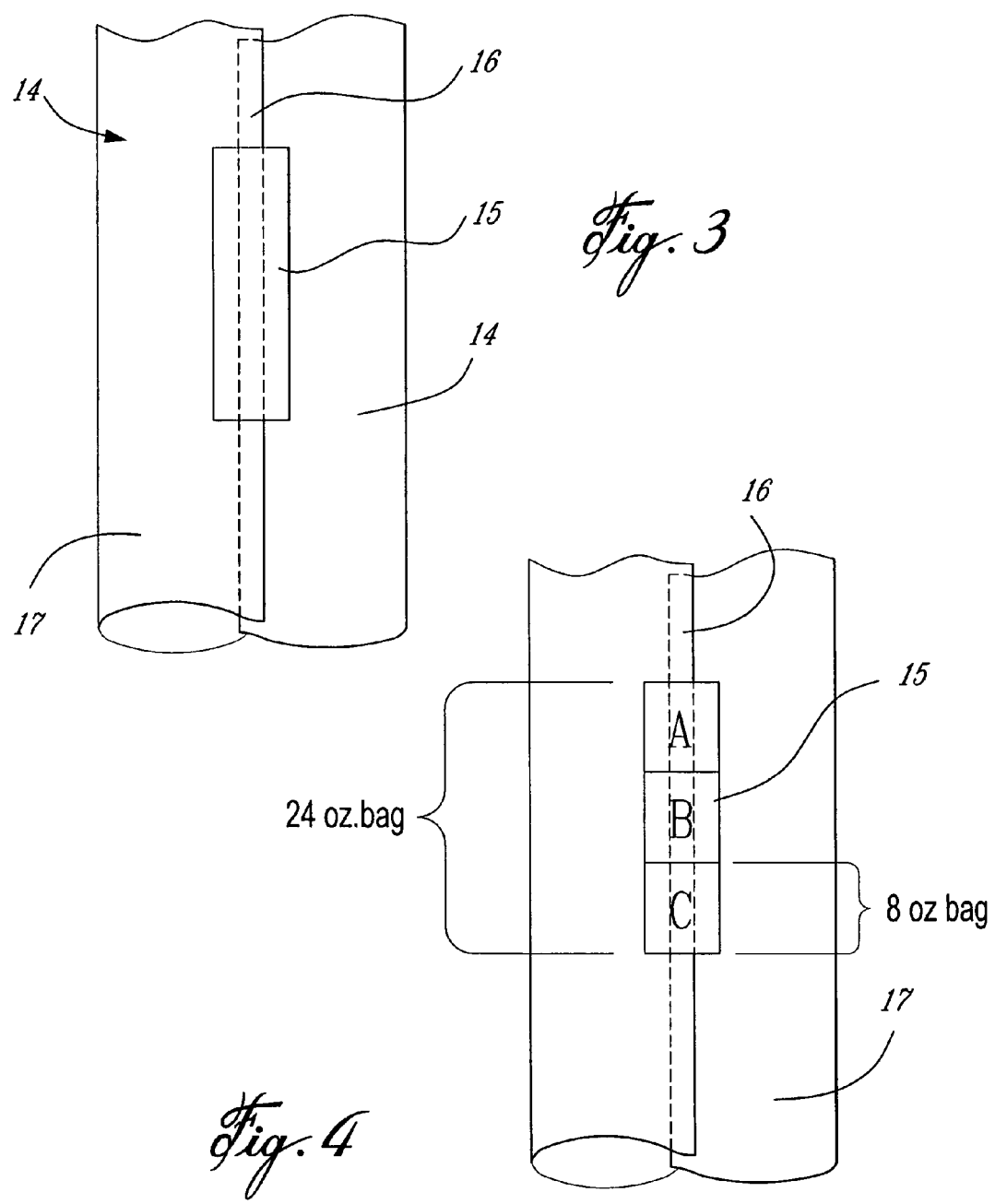

CONVERTIBLE COMPUTER CONTROLLED FFS BAGGING MACHINE

TECHNICAL FIELD

The present invention relates to a convertible computer controlled FFS machine and method of operation capable of forming from a single machine pouches of different sizes and contents and particularly, but not exclusively to a vertical form fill and seal (VFFS) machine capable of operating at high speeds.

BACKGROUND ART

In the liquid packaging industry and specifically for the packaging of liquid contents into pouches, it is common practice to produce from a single machine a pouch from a plastic film role and to fill it with a liquid content simultaneously as the pouch is being formed and sealed. Such machines are commonly referred to as vertical form, fill and seal machines VFFS. These machines are adapted to form a pouch of predetermined size and fill it with a content of predetermined volume. Such a machine or machines are commonly associated with conveyors which convey the filled pouches to casers or to a bagger which places a predetermined number of these filled pouches into bags. Depending on the required desired output of a production of the plant, several of these machines and conveyor lines are installed. Further, dependent on the different sizes of pouches to be produced with different volume contents, several more machines and floor space is occupied by such operation. Accordingly, large investments are required to purchase machinery and to provide the requisite floor space to install such machines, conveyors and bagging equipment. Therefore, there is a need to provide a reduction of such high costs in equipment floor space and associated labour.

Further, these machines and their component parts require down time to adjust the machine to varying parameters such as the change of the pouch size, the type of liquid to be bagged, the need to clean the machine for sanitary purposes and particularly so in diary operations, to modify the sealing jaws to suit different plastic film compositions, etc, etc. This down time of these machines is also an expensive factor in the cost of operation and of the number of machines required in the bagging plant.

SUMMARY OF INVENTION

It is a feature of the present invention to provide a convertible, computer controlled, form, fill and seal bagging machine and method which overcomes the above mentioned disadvantages of the prior art.

A further feature of the present invention is to provide a convertible computer controlled, form, fill and seal FFS bagging machine capable of producing, from a single machine, pouches of different size and content volumes and wherein the machine is fully automatically controlled by a computer.

Another feature of the present invention is to provide a method of forming, filling and sealing pouches of a desired selectable programmed size and volume from at least two or more program sizes from a single forming, filling and sealing machine.

Another feature of the present invention is to provide a FFS bagging machine with increased output capacity and speed of operation.

According to the above features, from a broad aspect, the present invention provides a convertible computer controlled form, fill and seal (FFS) bagging machine. The bagging machine comprises film draw means to draw a folded film sheet about a pouch former with the film sheet having overlapped along longitudinal free edge portions. First sealing means is provided to heat fuse the overlapped edge portions together to form a hollow film tube. Temperature control means is provided to control the temperature of the sealing means. Transverse sealing means is provided to form a transverse seal across the hollow film tube and is synchronized with the first sealing means. Content feed means is provided to supply a predetermined content in the hollow tube at a pouch forming station thereof. A computer control means is provided to control the film draw means, the sealing time of the first sealing means, the temperature control means, the sealing time of the transverse sealing means, and the rate of feed of the content feed means whereby to produce pouches of a programmed size filled with a programmed content volume. The machine has the capability of producing pouches of different sizes with different content volumes by computer inputting means.

According to a further broad aspect of the present invention there is provided a method of forming, filling and sealing pouches of a desired selectable programmed size and content volume from two or more programmed sizes and from a single pouch forming, filling and sealing machine. The method comprises the steps of selecting from a computer controlled panel desired parameters of a pouch to be formed and filled with a content. A folded film is automatically drawn about a pouch former with the film having overlapped free edge portions. The overlapped edge portions are fused together by a heat sealing means to form a vertical seal to produce a hollow film tube. The temperature of the sealing means is controlled by the computer. A transverse seal is formed by sealing jaws across the hollow film tube to form a transverse seam across the hollow film tube. A content is fed into the hollow film tube at a pouch forming station thereof. A computer controls the drawing speed of the folded film, the temperature and sealing time of the sealing means, the sealing time of the sealing jaws, and the feed rate of the content whereby to produce pouches of a predetermined size filled with a predetermined programmed content volume.

BRIEF DESCRIPTION OF DRAWINGS

A preferred embodiment of the present invention will now be described with reference to the accompanying drawings in which:

FIG. 2 is a block diagram showing the automized computer controlled operation of the machine whereby to produce pouches of a predetermined programmed size filled with a predetermined programmed content volume, FIG. 3 is a schematic enlarged view of the hollow film tube drawn over the vertical sealing bar area of the pouch former, FIG. 4 is a view similar to FIG. 3 but showing a vertical seam being formed by striking the overlapped film portions with three successive strokes of the vertical sealing bar.

DESCRIPTION OF PREFERRED EMBODIMENTS

Figure 1:
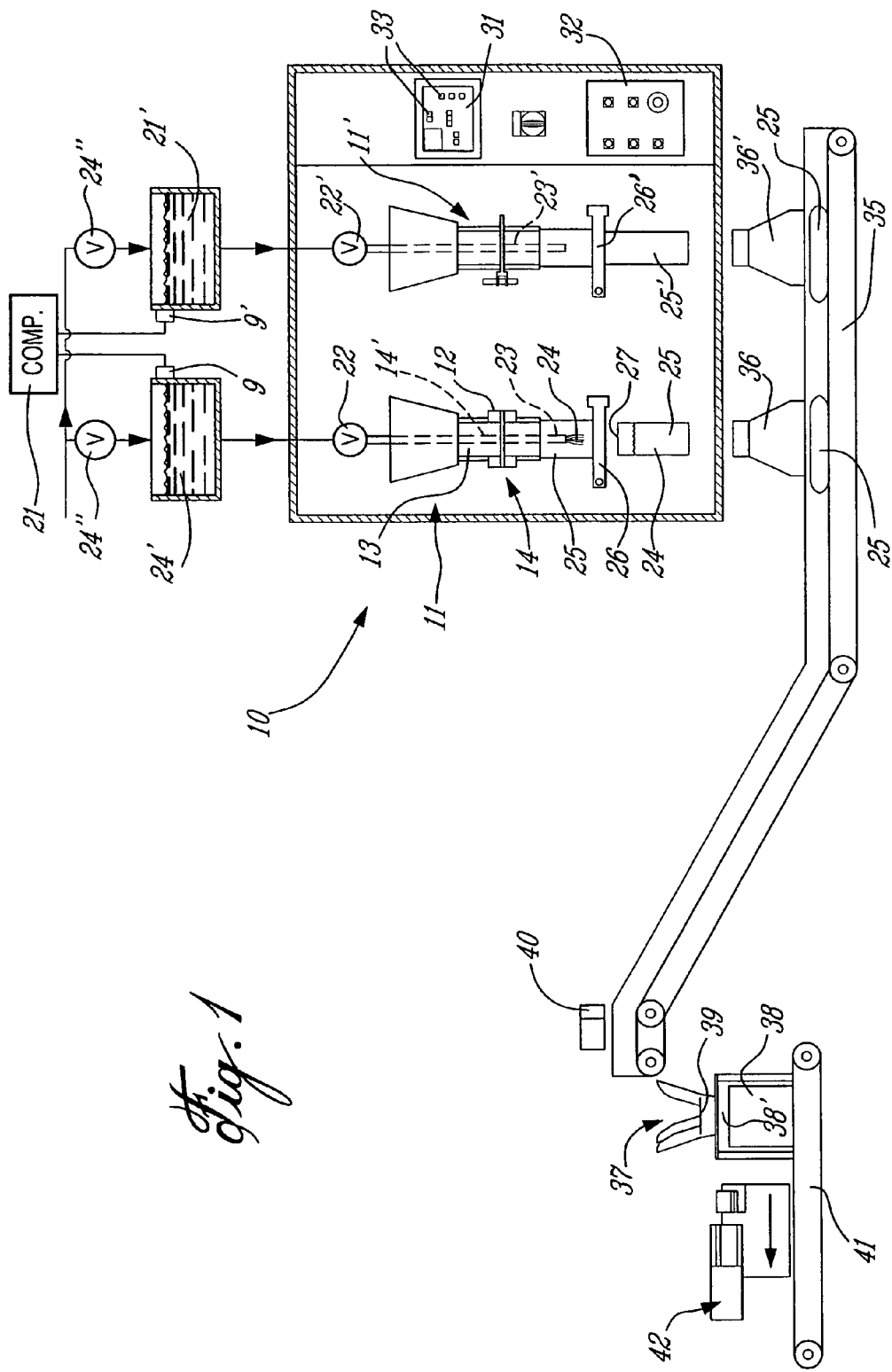
FIG. 1 is a schematic view of a dual head vertical form, fill and seal (VFFS) bagging machine of the present invention incorporated into a bagging system.

Referring to the drawings, more particularly to FIG. 1 there is shown generally at 10 a convertible computer controlled vertical form, fill and seal (VFFS) bagging machine having a dual head 11 and 11'. Such machines are well known in the art and as above described they are equipped to produce a pouch of a single predetermined size having a predetermined liquid content. Each of these heads 11 and 11' are provided with film drives 12 whereby to pull an overlapped film sheet 13 over a pouch former 14 which has a flat section 14' to form the back support of a vertical sealing bar 15 under which the overlapped longitudinal free edge portions 16 are disposed, as more clearly illustrated in FIG. 3. The pouch former 14 forms a hollow film tube 17. Such pouch formers are well known in the art.

As shown in FIG. 2 the vertical sealing bar 15 has a resistive heating element 18 and the temperature of the resistive element and the vertical sealing jaw is controlled by a temperature control 19 associated with the vertical sealing bar 15 which is actuated by a piston 20 or other suitable actuation means to position the vertical sealing bar against the overlapped film and to retract it therefrom. The application time of the piston is also controlled by the computer 21.

As shown in FIG. 1 each of the heads 11 and 11' are fed a liquid, such as milk, water or other beverage located in a supply container 24 and 21, respectively. The level of liquid within the containers is maintained constant by valve s24" and 21" to maintain a constant static pressure of the liquid fed to the control valves 22 and 22' which are controlled by the computer 21 to adjust a constant flow rate of the fluid in the feed pipes 23 and 23'. Level sensors 9 and 9' feed control signals to the computer controller 21. The feed pipes 23 and 23' release the liquid 24 into pouches 25 and 25' being formed and located above a transverse sealing means, herein a transverse sealing jaw assembly 26 and 26'. The feed of the liquid 24 is continuous. The sealing jaws 26 form a transverse seal for the top end 27 of a formed pouch 25 filled with the liquid 24 therein. Simultaneously the transverse seal slits the filled pouch 25 to release it from the film tube 17. The vertical sealing bar 15 also forms the bottom seal of the upper pouch 25 being filled.

The computer controlled means, herein the computer 21 controls a motor, not shown, to drive the film sheet. The computer 21 also controls the piston 28 which actuates the transverse sealing jaws 26. A temperature control 29 is also controlled by the computer 21 to control the temperature of the transverse sealing jaws 26 as schematically illustrated in FIG. 2.

The computer 21 by controlling these parameters can produce pouches of predetermined size and filled with a predetermined content volume of the liquid. These different size bags with different liquid volumes are stored in a memory 30 of the computer and through an input screen 31 located on the control panel 32 of the machine 10, a predetermined size pouch and content volume can be pre-selected by touch control buttons 33. The machine will self-adjust itself whereby to form, and fill pouches of different sizes. Also, by controlling the pistons 20 and 28 the pressure of the vertical and transverse sealing bars can be varied depending on the film composition and the size of pouches formed. For example, and with reference to FIG. 4, if the vertical sealing bar 15 is three times as long as a pouch being formed each time the vertical sealing bar is applied against the drawn hollow film tube 17 the vertical sealing bar will strike the overlapped film portions 16 three times before the film tube is drawn below the vertical sealing bar. Accordingly, in order to ensure that the vertical sealing bar does not burn through the overlapped free edge portions 16, the temperature of the vertical sealing bar must be controlled whereby when the vertical sealing bar has struck the overlapped film portion 16 at its bottom zone C a perfect vertical seal will be formed. A seal will begin to form in zone A and then progressively in zone B where the seal has struck that zone twice. Therefore, after having been struck three times in zone C a perfect seal is formed. The temperature and pressure of the vertical sealing bar is thus an important feature and it is automatically controlled by the controller of the computer and depending on the size of pouches being formed or the length of hollow film tubing drawn at each sealing stroke of the vertical sealing bar and also the type of film being used. This is all programmed in the memory 30 of the computer and it automatically adjusts itself depending on the input commands received from the input screen 31. The input screen 31 can also switch to a display screen 34 automatically by depressing one of the control buttons 33 whereby to display information as will be described later.

The twin head vertical form, fill and seal machine 10 as shown in FIG. 1 is herein shown adapted in a pouch bagging system and wherein the machine 10 feeds filled pouches 25 onto a conveyor 35 through orientation boxes 36 and 36' associated with each of the heads 11 and 11', respectively. The orientation boxes 36 and 36' position the filled pouches 25 with a predetermined orientation onto the conveyor 35. The computer 21 is fed signals relating to the speed of the conveyor 35 and it also knows the drop time of the pouches 25 from their respective heads and this drop time is dependent on the size of the pouches and the liquid content therein. This is all pre-calculated by the computer when the parameters are inputted into the computer. Accordingly, the computer is aware of the spacing between the pouches 25 on the conveyor belt. The computer also adjusts the synchronized interval between the servo-motors (not shown) which drive the two heads to achieve this substantially constant spacing between the pouches 25 which is of great importance to the bagging machine 37.

Oriented pouches 25 on the conveyor 35 are conveyed to a bagger machine 37 to place a predetermined number of filled pouches into a bag 38 supported under a discharge opening 39 of the bagger machine 37. The bagger machine 37 is also controlled by the computer as shown in FIG. 2. To effect a change of pouch size it is merely necessary to change the format selection on the computer screen 31 and the machine automatically adjusts its equipment to produce the selected format and its content.

A counter 40 is positioned at a convenient location along the conveyor 35 to count the filled pouches 25 which are conveyed thereon and it feeds signals to the computer 21, as shown in FIG. 2, whereby the computer can control the number of filled pouches being placed in each bag 38 supported under the bagger machine 37. Once a bag 38 is filled with a predetermined number of filled pouches 25, it is then discharged through a discharge conveyor 41 into a bag closing station 42 to close an opened top end 38' of the loaded bag. After a bag is discharged from under the bagger machine, a bag positioner positions another bag under the bagger machine to accept a further predetermined number of filled pouches therein. Such bagger machines are well known in the art and are described in the patent literature. The signals from the counter 40 are stored in the memory 30 of the computer whereby it can keep record and display the number of pouches produced by each of the twin heads of the VFFS machine 10. The computer can also display the number of pouches left to be produced by the machine and the production time which is left for each of the twin heads. It is pointed out that if one of the heads is idle due to a film roll change, the other head may continue operation and vice-versa. By controlling the various parameters, the computer can also control the speed of operation of the twin head VFFS machine. The bagger is also automatically controlled.

Figure 5:
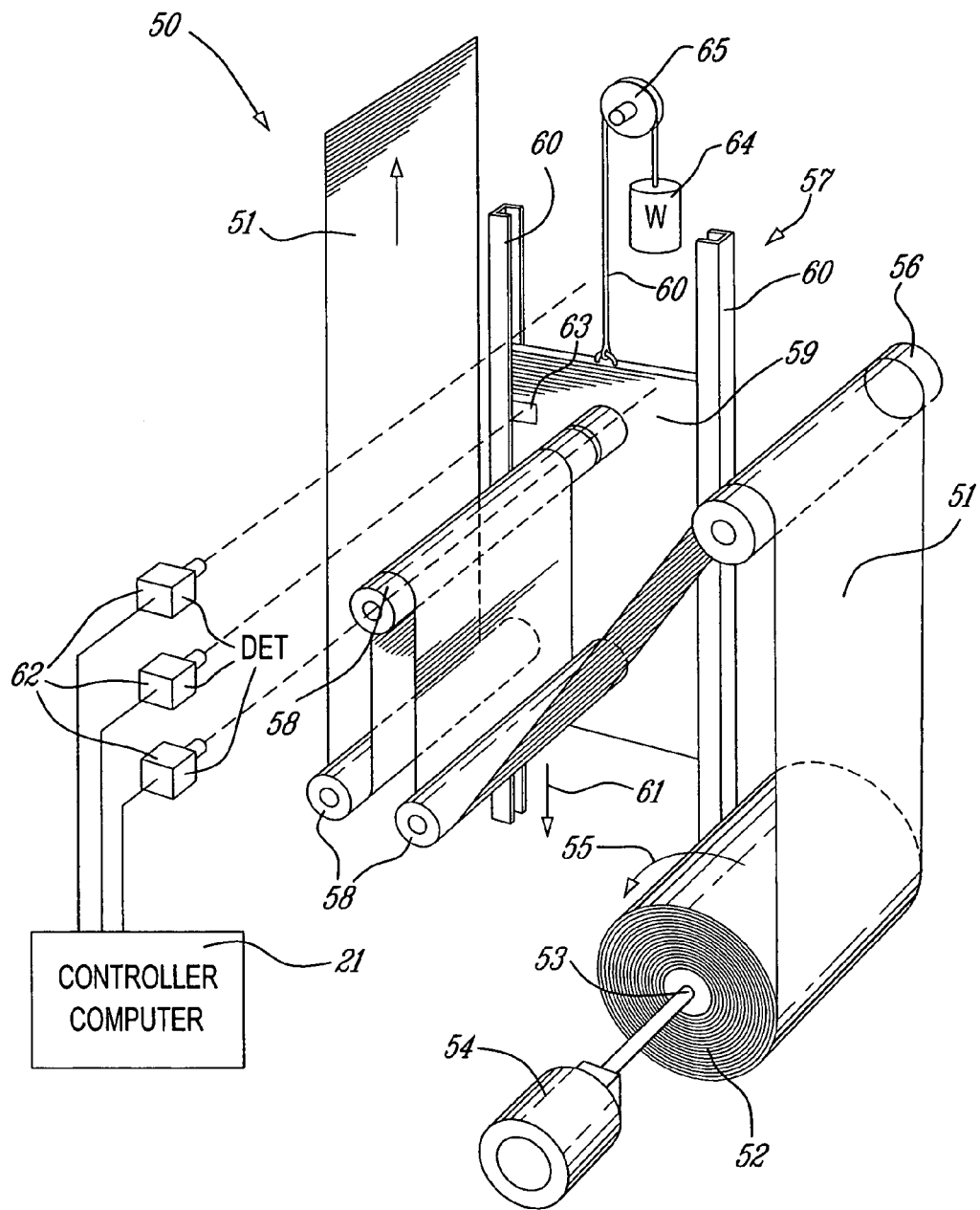
FIG. 5 is a simplified perspective view of the film supply mechanism and control.

With reference now to FIG. 5, there is shown the construction of a film dispensing assembly 50 in order to achieve high speeds of operation wherein this machine can dispense filled pouches, above 125 pouches per minute, with the pouches being formed approximately 11 inches long by 6 inches wide. As hereinshown, the machine houses two film rolls 52, only one being shown and illustrated herein which feeds a film sheet 51 to each of the formers 11 and 11'. The film roll 52 has a support shaft 53 which is coupled to a drive motor 54 which rotates the film roll 52 in the direction of arrow 55 whereby to dispense film at a predetermined rate. The film sheet 51 is disposed about a stationary guide roll 56 which feeds a film sheet to a displaceable film tensioning means 57 which consists of two or more dancer rolls, herein dancer rolls 58 which are each secured to a displaceable weighted support frame 59. The support frame 59 is held in guided displacement between guide rails 60 or other suitable guide means. The weighted frames and the roller apply a downward force in the direction of arrow 61 whereby to maintain the film sheet 51 taut as it is fed and guided about the formers 11 and 11'.

During operation, the film drive 12 which pulls the film about the former causes the displaceable weighted frame 59 to move upwardly due to this pulling force and therefore it is important to control the tension in the sheet to prevent the film sheet 51 from stretching thereby changing the characteristic of the film which could be detrimental when seals are being formed by the sealing heads. Accordingly, it is important to dispense the film sheet at a rate proportional to the draw speed to maintain a substantially constant tension within the film sheet. This is achieved by providing detectors 62 which sense a marker 63 on the weighted, displaceable frame 59 to detect its position. These detectors 62 feed positioning signals to the control computer 21 which in turn control the motor 54 as illustrated in FIG. 5. Accordingly, the computer and the drive motor 54 control the position of the weighted frame 59 within a predetermined mid-range dependent on the draw speed and rate of feed. However, should the draw speed required by the inputted parameters exceed a predetermined value, it becomes necessary to lower the weight of the displaceable film tensioning frame 59 and to do so there is further provided a counter-weight mechanism which is simply a counter-weight 64 of known weight secured about a guide pulley 65 and to an attachment 66 secured to the displaceable frame 59 whereby to pull the frame upwardly to thereby maintain the film sheet taut at very high speeds.

Although the drawings herein illustrate a vertical form, fill and seal machine with twin heads, it is to be understood that the convertible aspect of the machine can be applied to horizontal formers. Accordingly, the method of forming, filling and sealing pouches of a desired selectable programmed size and volume from two or more programmed sizes and from a single bag forming, filling and sealing machine, is a novel feature which achieves the desired features of the invention as herein before mentioned. The feature of selecting from a computer controlled panel desired parameters of a pouch to be formed and filled with a predetermined content volume and from a single machine is an important feature of the present invention.

As the machine automatically draws a folded film about a pouch former with the film having overlapped free edge portions along which a vertical sealing bar is applied to heat fuse the film to form a vertical seal in a controlled manner depending on the bag sizes all of which is controlled by a computer to ensure a perfect seal for different size pouches. The temperature of the sealing means as well as the pressure of the vertical sealing bar is controlled by the computer as the same seal may be subjected to two or more heat sealing applications. The computer also controls the transverse sealing jaw assembly 26 to form a transverse seal across the hollow film tube and simultaneously detach the sealed bag from the film tube. A liquid content is continuously fed into the film tube as filled pouches are being formed all of which is controlled by the computer 21. Accordingly, the computer 21 controls the drawing speed of the folded film, the temperature and sealing time of the vertical sealing bar 15 and the transverse sealing jaw assembly 26 and the feed rate of the liquid content through the valve 22 whereby to produce pouches of a predetermined programmed size filled with a predetermined program content volume.

The computer also selects the sealing temperature of the vertical sealing bar and the selected sealing pressure thereof depending on the size of pouch being formed and the film material being used. The speed of operation of each of the twin heads is also controlled by the computer 21 as well as the speed of the bagger machine 37 and the speed of the conveyors 35 and 41 to control the production output of the system as illustrated in FIG. 1.

It is within the ambit of the present invention to cover any obvious modifications of the preferred embodiment described herein, provided such modifications fall within the scope of the appended claims.

The invention claimed is:

1. A convertible computer controlled FFS (form, fill and seal) bagging machine comprising:

film draw means for drawing a film sheet about a pouch former with said film sheet being folded and overlapped along longitudinally free edge portions;

first sealing means for heat fusing said overlapped edge portions together to form a hollow film tube, said first sealing means comprising vertical sealing bar having a length;

temperature control means for setting a temperature of said first sealing means;

transverse sealing means for forming a transverse seal across said hollow film tube and synchronized with said first sealing means;

pressure control means for setting a pressure of said first sealing means;

content feed means for supplying a predetermined content in said hollow film tube at a pouch forming station thereof;

computer inputting means for accepting a selection of predetermined programmed pouch sizes; and computer control means for controlling and synchronizing said film draw means, said first sealing means, said temperature control means, said pressure control means, said transverse sealing means, and said content feed means whereby to produce pouches of a predetermined programmed pouch size filled with a predetermined programmed content volume;

wherein the computer control means simultaneously controls the pressure and the temperature of said first sealing means to apply a number of sealing applications to said overlapped longitudinal edge portions to progressively form a vertical seal along said overlapped longitudinal edge portions based on the selected predetermined programmed pouch size and the length of the vertical sealing bar.

2. A convertible controlled FFS bagging machine as claimed in claim 1 wherein said machine is a vertical form, fill and seal machine (VFFS).

3. A convertible controlled FFS bagging machine as claimed in claim 1 wherein said content is a liquid content, said content feed means being a continuous flow feed means, and a control valve controlled by said computer control means to provide a predetermined flow rate of said liquid from said flow feed means dependent on a predetermined programmed pouch weight.

4. A convertible controlled FFS bagging machine as claimed in claim 3 wherein said machine is a twin head FFS machine provided with two of said pouch formers whereby to form and fill pouches at two separate locations in said machine, said pouches being formed in a synchronized manner as controlled by said computer control means, said machine being adapted to feed filled pouches to a pouch bagging system having a bagger machine.

5. A convertible controlled FFS bagging machine as claimed in claim 4 further comprising conveyor means for conveying said filled pouches from said twin VFFS machine to said bagger machine to place a predetermined number of filled pouches in a bag, said bagger machine being controlled by said computer control means.

6. A convertible controlled FFS bagging machine as claimed in claim 5 further comprising pouch detection means for counting the number of pouches being conveyed to said bagger machine, said detection means feeding signals to said computer control means to control the number of filled pouches being placed in said bag.

7. A convertible controlled FFS bagging machine as claimed in claim 6 wherein said bagger machine further comprises bag discharge means for discharging and conveying loaded bags to a bag closing station to close an open top end of said loaded bags, and bag positioning means for positioning another bag under said bagger machine to accept a further predetermined number of filled pouches therein.

8. A convertible controlled FFS bagging machine as claimed in claim 5 wherein each of said twin head VFFS machine is provided with twin orientation boxes to position said filled pouches on said conveyor means with a predetermined pouch orientation.

9. A convertible controlled FFS bagging machine as claimed in claim 5 wherein said computer control means has a memory and visual display means to keep record and display of the number of pouches produced by each said twin heads VFFS, the number of pouches left to be produced, and the production time left by each said twin heads.

10. A convertible controlled FFS bagging machine as claimed in claim 1 further comprising a driver film supply roll to dispense film at a desired rate, a drive motor connected to a support shaft of said supply roll, said computer control means controlling the speed of operation of said drive motor, and displaceable film tensioning means for maintaining said film sheet taut.

11. A convertible controlled FFS bagging machine as claimed in claim 10 further comprising detection means for detecting the displacement of said displaceable film tensioning means and for feeding location signals to said computer control means to control said speed of operation of said drive motor.

12. A convertible controlled FFS bagging machine as claimed in claim 11 wherein said displaceable film tensioning means comprises two or more dancer rolls secured to a displaceable weighted support, said film sheet being trained between said dancer rolls and maintained taut by said weighted support, said weighted support being displaceable in a guide means, said detection means having two or more detection devices to detect the position of said weighted support along said guide means.

13. A convertible controlled FFS bagging machine as claimed in claim 12 further comprising a counter-weight mechanism securable to said weighted support to decrease the weight of said weighted support when said motor is to operate above a predetermined speed.

* * * * *